(12) United States Patent
Swartz

(10) Patent No.: US 7,434,679 B2
(45) Date of Patent: Oct. 14, 2008

(54) VERTICAL CONVEYOR

(76) Inventor: Kevin E. Swartz, 358 Mahoning St., Milton, PA (US) 17847

( * ) Notice: Subject to any disclaimer, the term of this patent is extended or adjusted under 35 U.S.C. 154(b) by 63 days.

(21) Appl. No.: 11/469,494

(22) Filed: Sep. 1, 2006

(65) Prior Publication Data

US 2007/0007111 A1    Jan. 11, 2007

Related U.S. Application Data

(62) Division of application No. 10/974,058, filed on Oct. 27, 2004, now abandoned.

(51) Int. Cl.
*E21B 19/08* (2006.01)
*B65G 15/30* (2006.01)

(52) U.S. Cl. .................. 198/626.1; 198/626.5

(58) Field of Classification Search .... 198/626.1–626.6
See application file for complete search history.

(56) References Cited

U.S. PATENT DOCUMENTS 3,285,485 A * 11/1966 Slator ...................... 226/172
3,325,977 A   6/1967 Kirsten .......................... 53/250
3,952,861 A   4/1976 Holmqvist et al. .......... 198/204
4,047,452 A   9/1977 Eddy ........................... 475/120
4,422,541 A   12/1983 Lisec ........................... 198/627
4,585,061 A * 4/1986 Lyons et al. ................ 166/77.3
4,655,291 A   4/1987 Cox ............................. 166/385
4,964,447 A   10/1990 Farrell et al. ................ 144/176
5,188,174 A   2/1993 Anderson, Jr. ............. 166/77.3
5,335,780 A   8/1994 Watson ......................... 198/787
5,895,193 A   4/1999 Ung .............................. 414/327
5,924,551 A   7/1999 Radmall ................... 198/861.1
6,471,050 B2  10/2002 Ikeda et al. .............. 198/861.1

* cited by examiner

*Primary Examiner*—Mark A Deuble
(74) *Attorney, Agent, or Firm*—Hooker & Habib, P.C.

(57) ABSTRACT

A vertical conveyor for conveying a stream of closely spaced articles along a conveyor path includes at least one pair of roller chain assemblies that face the conveyor path. Each chain assembly includes a roller chain carrying grippers that extend into the conveyor path to securely hold articles between them. Bearings engage the roller chain to limit chain deflection under load to assure reliable conveyance of the articles.

27 Claims, 19 Drawing Sheets

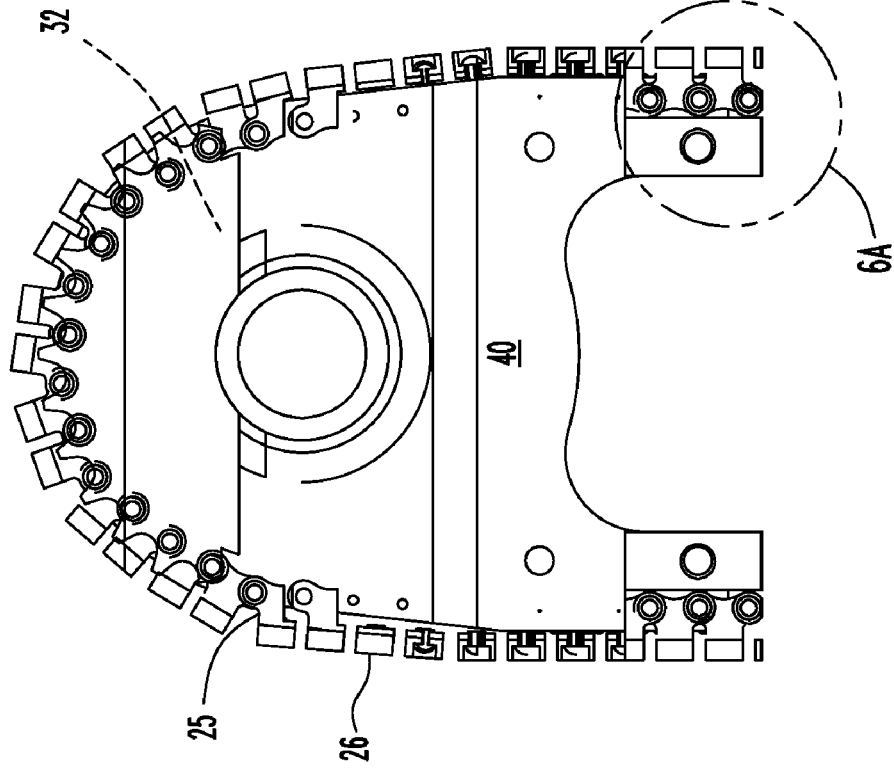
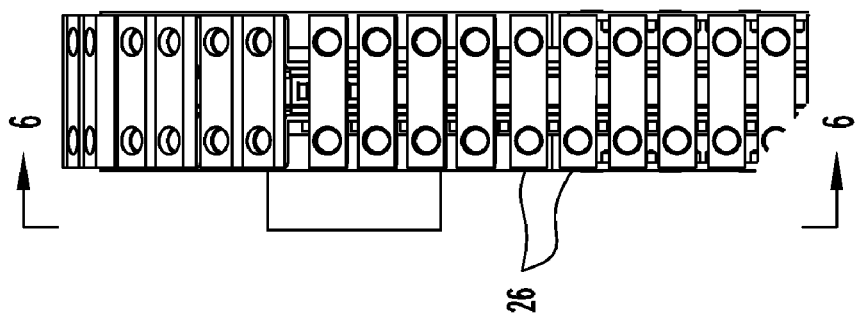

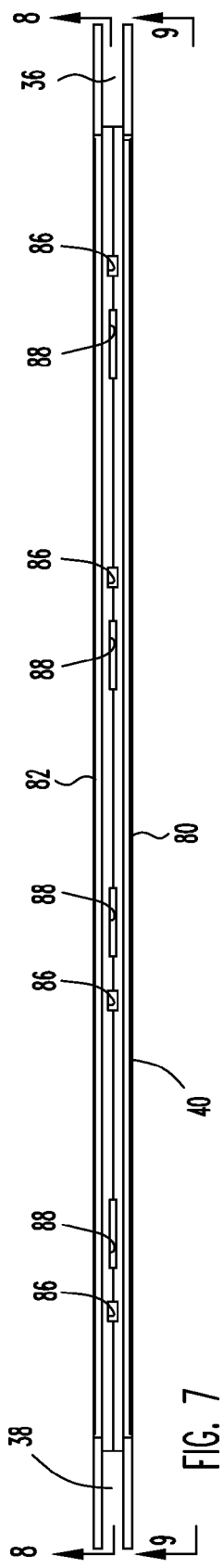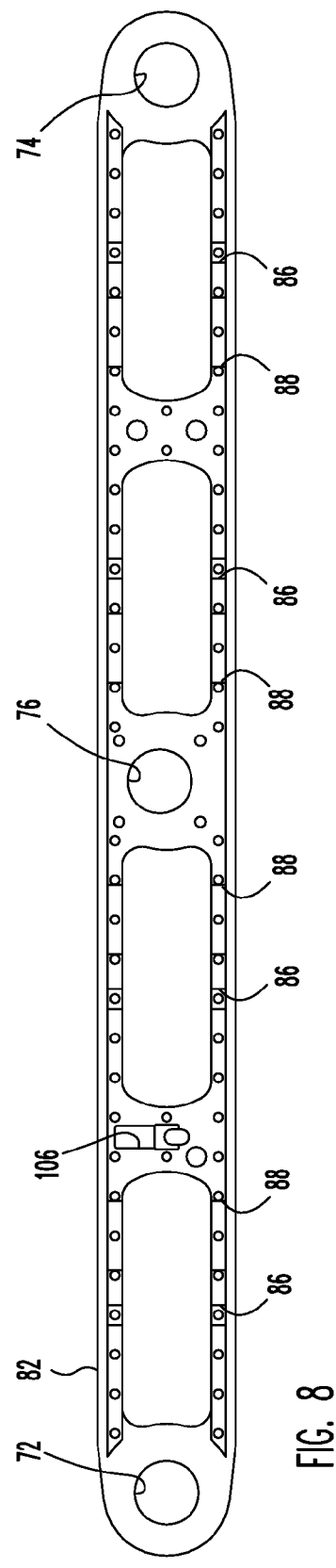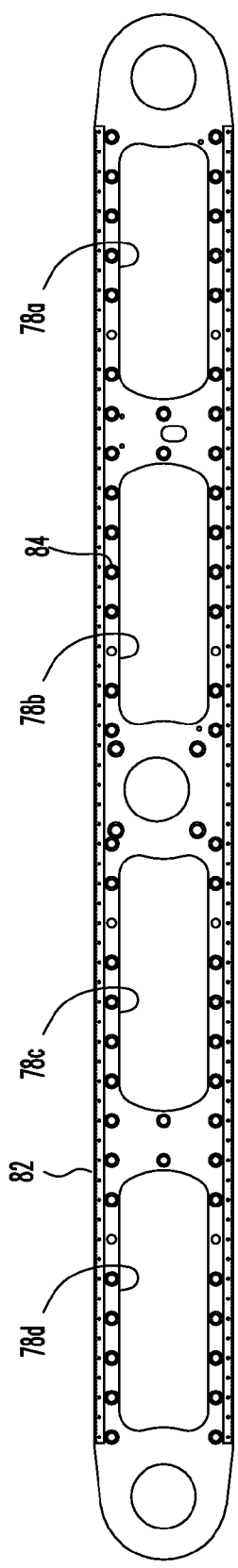

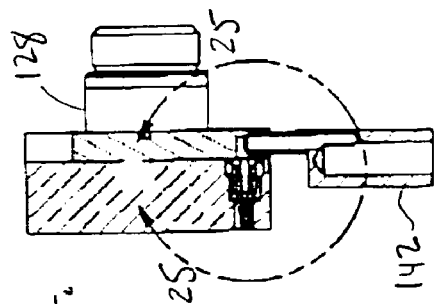
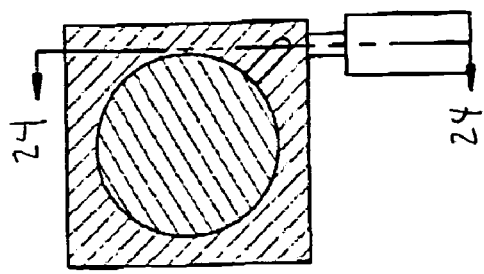
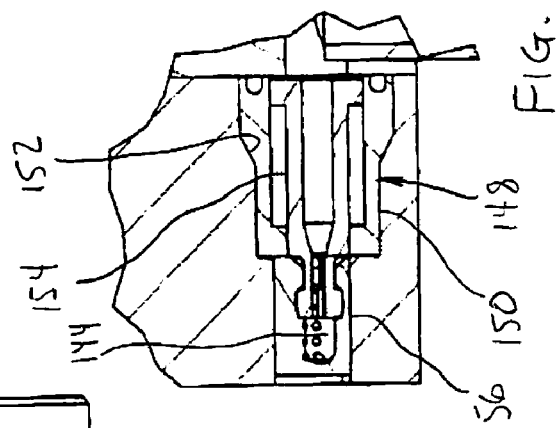
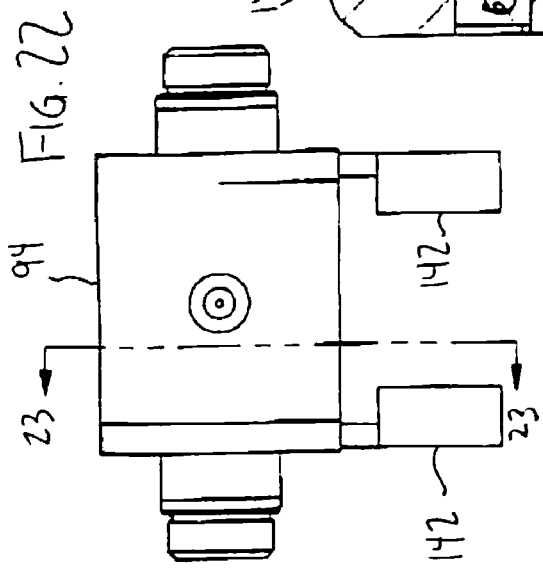
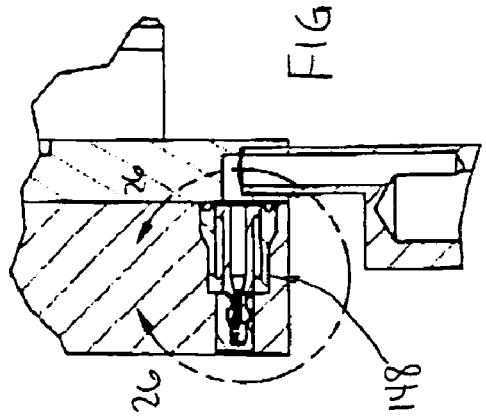

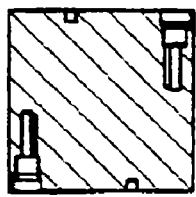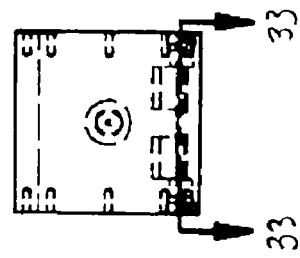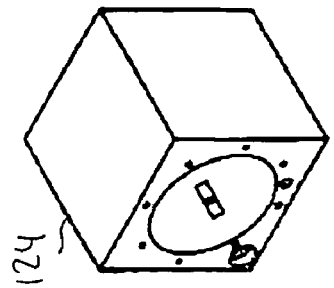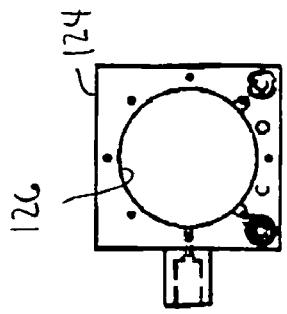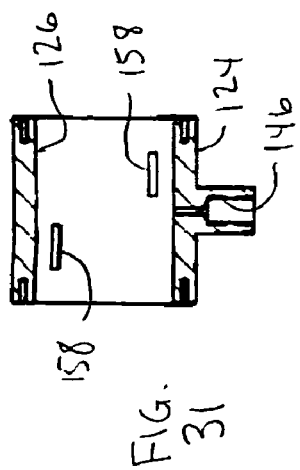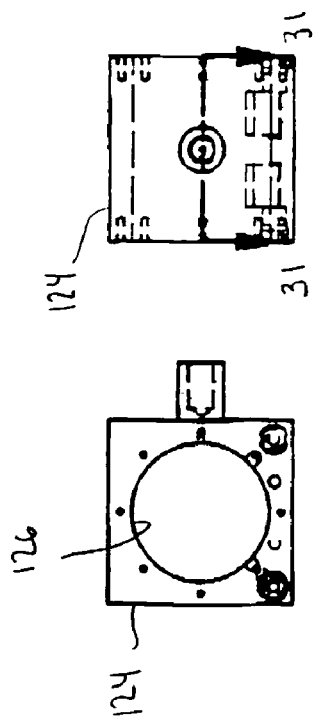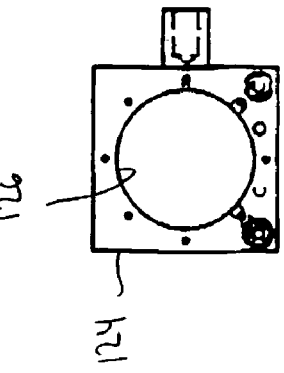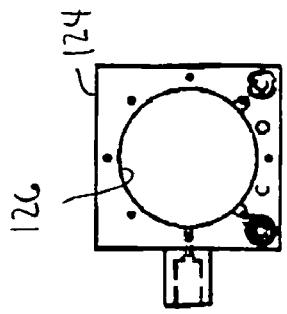

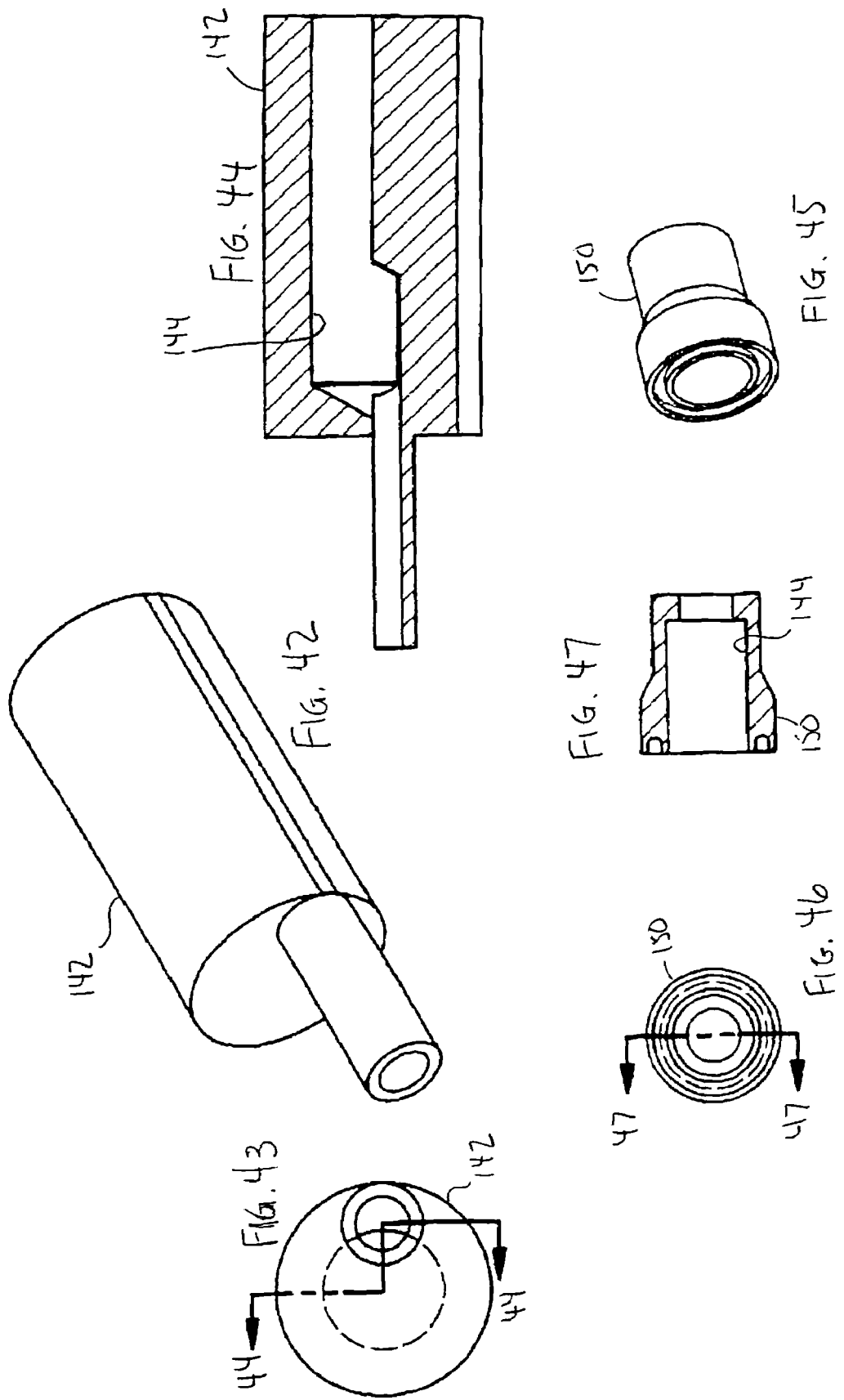

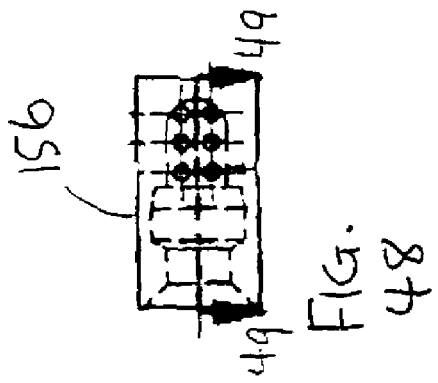
FIG. 48
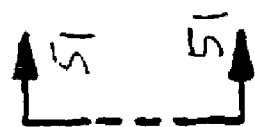
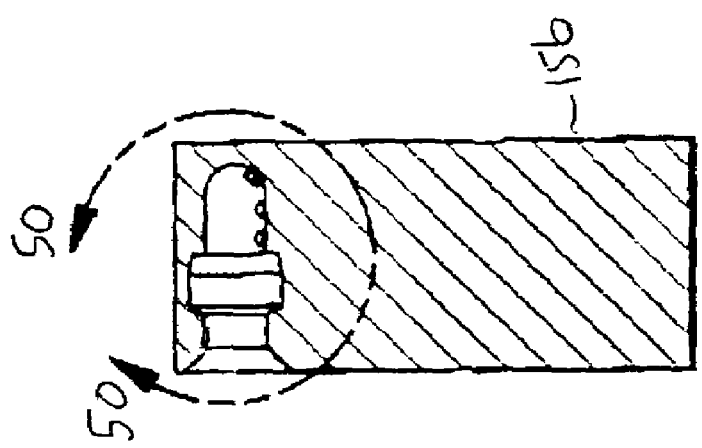
FIG. 49
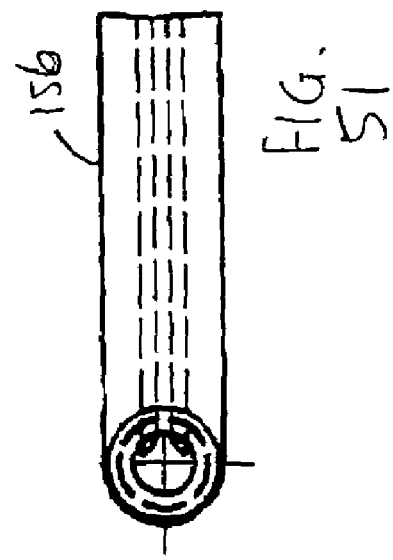
FIG. 51
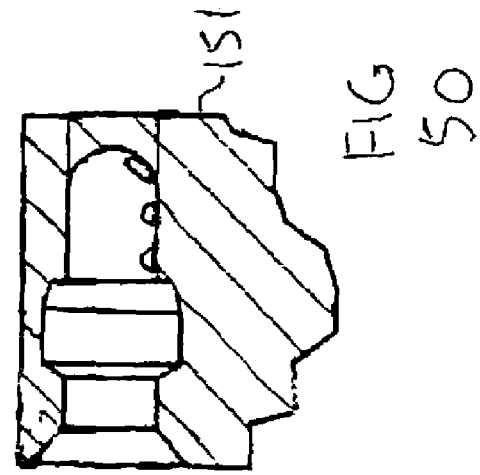
FIG. 50

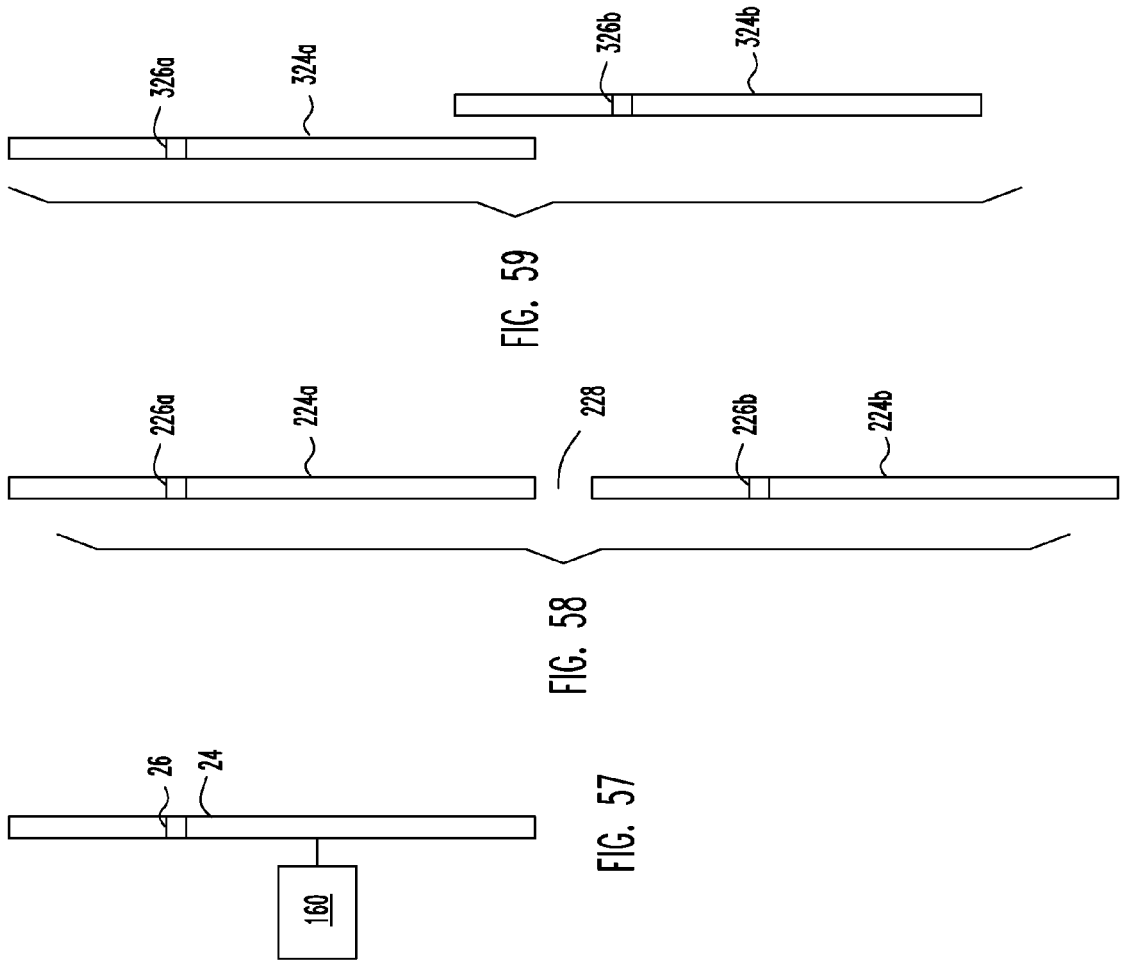

VERTICAL CONVEYOR

This application is a division of U.S. patent application Ser. No. 10/974,058 filed Oct. 27, 2004 now abandoned.

BACKGROUND OF THE INVENTION

The present invention relates generally to conveyors, and specifically to conveyors capable of transporting articles along a vertical conveyor path.

DESCRIPTION OF THE PRIOR ART

Articles or workpieces are moved from workstation to workstation or from processing area to processing area in an industrial plant or warehouse. It is often desired to move a continuous stream of closely-spaced articles vertically from one elevation to another within the plant or warehouse.

Conveyor belts and roller tables are often used to move articles. But conveyor belts and rollers are limited to horizontal or substantially horizontal conveyor runs.

Vertical conveyors are known that can move articles along a vertical conveyor path. One conventional vertical conveyor includes facing conveyor belts. Articles are squeezed between the belts, and the belts deflect to generate a force that carries the articles along the belts. The articles, however, must be spaced apart to enable the belts to grip them. Closely spaced articles cannot be conveyed.

Thus there is a need for an improved conveyor for conveying a stream of closely-spaced articles from one vertical elevation to another.

BRIEF SUMMARY OF THE INVENTION

The invention is an improved conveyor for conveying a stream of closely-spaced articles from one vertical elevation to another. The articles can be touching and yet still be conveyed by the improved conveyor of the present invention.

A conveyor in accordance with the present invention includes a pair of opposing roller chains that extend along a conveyor path. The roller chain includes a number of grippers that are appropriately sized to engage an article being conveyed and convey the article along the path. The conveyor path can be oriented at any angle, including a vertical path or a horizontal path.

The roller chain is preferably supported along its length to resist chain sagging or deflection during conveyor operation. This enables the grippers to hold even closely-spaced small articles. The grippers can be carried on a single roller chain, or the ends of the grippers can be attached to separate roller chains with the grippers spanning across the chains.

In preferred embodiments of the invention each roller chain is part of a roller chain assembly. The roller chain is carried on a rail and is driven by a motor mounted on the rail. This enables conveyors to be built using a number of roller chain assemblies as "building blocks" or drive modules.

In possible embodiments the pair of roller chain assemblies extend along the full conveyor path. A second pair of roller chain assemblies can be spaced in a direction transverse to the conveyor path. The pairs of roller chains operate in parallel to move articles along the conveyor path.

In other possible embodiments a second pair of roller chain assemblies are spaced in a direction parallel with the conveyor path. The pairs of roller chain assemblies operate in series to move articles along a longer conveyor path. The pairs of roller chain assemblies can partially overlap in a direction along the conveyor path to enable articles to be simultaneously held by both pairs on the overlapping portion of the path.

In one preferred embodiment the motor is a hydraulic brake motor having an integral brake. The brake is hydraulically released and is automatically applied if hydraulic pressure is lost. The roller chain assembly also includes at least one emergency stop assembly that engages the roller chain to stop the chain.

The motor can reversibly drive the roller chains if desired so that articles can be conveyed in either direction along the conveyor path. The roller chains hold the articles between them even when the chains are stopped or are reversing direction.

Other objects and features of the present invention will become apparent as the description proceeds, especially when taken in conjunction with the accompanying nineteen drawing sheets illustrating four embodiments of the invention.

BRIEF DESCRIPTION OF THE DRAWINGS

FIG. 5 is a partial front view of the roller chain assembly taken along line 5-5 of FIG. 3;

FIG. 6 is a partial side view of the roller chain assembly taken along line 6-6 of FIG. 5;

FIG. 7 is a top view of the vertical rail of the roller chain assembly;

FIG. 8 is a side view of the vertical rail taken along line 8-8 of FIG. 7;

FIG. 9 is a view of the inner side of one of the rail halves taken along line 9-9 of FIG. 7;

FIG. 22 is a side view of the cylinder shown in FIG. 18;

FIG. 23 is a sectional view taken along line 23-23 of FIG. 22;

FIG. 24 is a sectional view taken along line 24-24 of FIG. 23;

FIG. 25 is an enlarged view of the area taken along line 25-25 of FIG. 24;

FIG. 26 is an enlarged view of the area taken along line 26-26 of FIG. 25;

FIG. 27 is a perspective view of the cylinder housing of the cylinder shown in FIG. 18;

FIGS. 28-30 are top, front, and bottom views respectively of the housing shown in FIG. 27;

FIG. 31 is a sectional view taken along line 31-31 of FIG. 29;

FIG. 32 is a rear view of the housing shown in FIG. 27;

FIG. 33 is a sectional view taken along line 33-33 of FIG. 32;

FIG. 42 and 43 are perspective and front views of a fluid connection connected to the cylinder shown in FIG. 18;

FIG. 44 is a sectional view taken along line 44-44 of FIG. 43;

FIGS. 45 and 46 are perspective and front views respectively of an actuator cylinder of the cylinder shown in FIG. 18;

FIG. 47 is a sectional view taken along line 47-47 of FIG. 46;

FIG. 48 is a top view of a manifold of the cylinder shown in FIG. 18;

FIG. 49 is a sectional view taken along line 49-49 of FIG. 48;

FIG. 50 is an enlarged view of the area taken along line 50-50 of FIG. 49;

FIG. 51 is a view taken along line 51-51 of FIG. 48;

FIG. 57 is a simplified view of the roller chain assembly shown in FIG. 2;

FIG. 58 is similar to FIG. 57 but illustrates a second embodiment vertical conveyor;

FIG. 59 is similar to FIG. 57 but illustrates a third embodiment vertical conveyor; and FIG. 60 is similar to FIG. 57 but illustrates a fourth embodiment vertical conveyor.

DETAILED DESCRIPTION OF THE PREFERRED EMBODIMENTS

Figure 1:
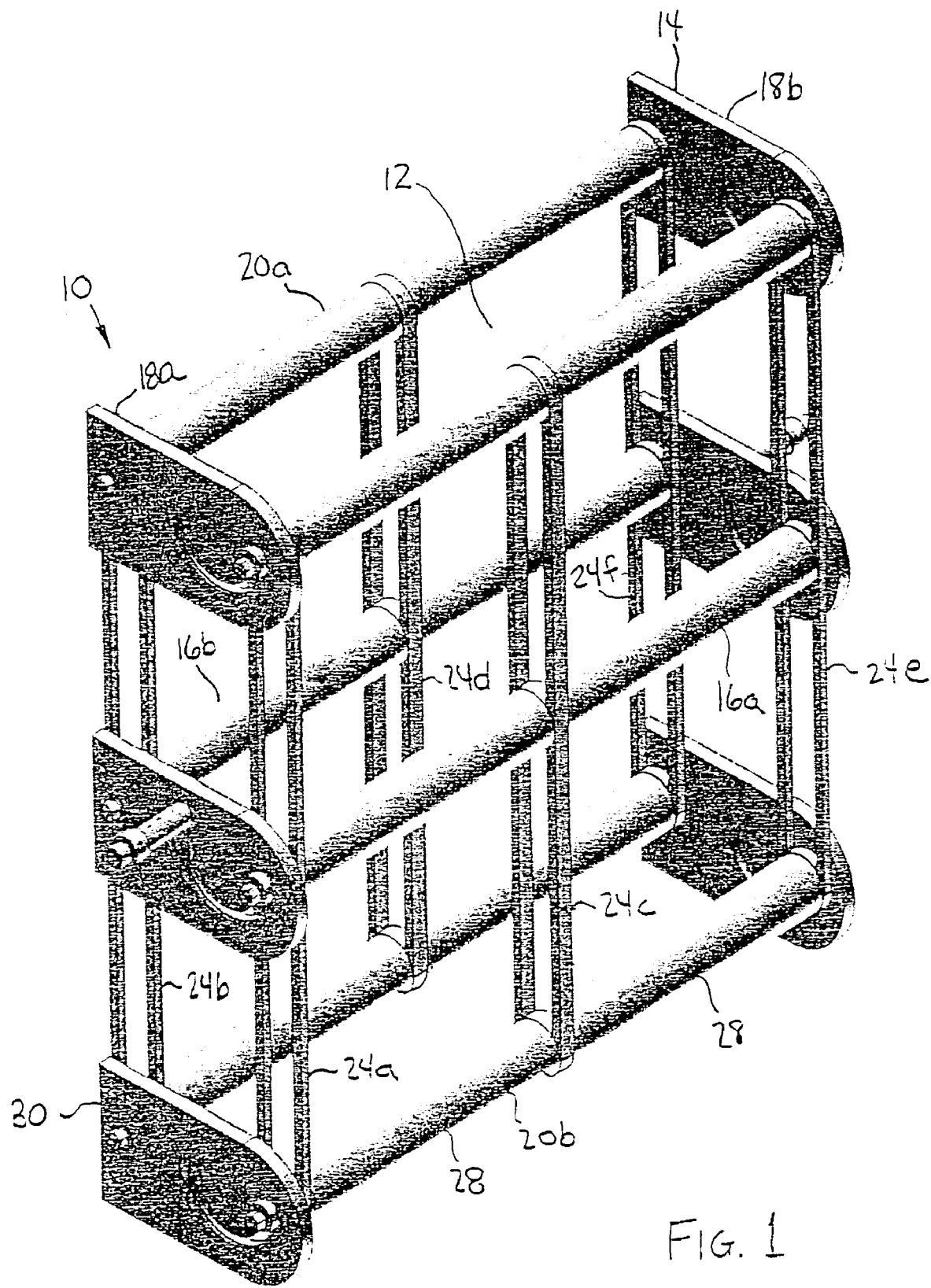
FIG. 1 is a simplified perspective view of a vertical conveyor apparatus in accordance with the present invention.

FIG. 1 illustrates a vertical conveyor 10 in accordance with the present invention. The conveyor 10 forms a conveyor path 12 enclosed by a frame 14 having front and rear frame sides 16a, 16b and left and right frame ends 18a, 18b. Conveyor path 12 extends vertically between upper and lower frame ends 20a, 20b.

The illustrated vertical conveyor 10 lowers a stream of closely-spaced pieces of wood molding (not shown) a distance of about six feet from an intake at the upper frame end 20a to a discharge for a work station at the lower frame end 20b. The frame 14 is securely mounted to a rigid support (not shown) during use.

The molding is conveyed through the frame 14 with the length of the molding horizontal, that is, the conveyor path 12 is perpendicular to the longitudinal axis of the molding. Other embodiments of the present invention can, however, convey molding upwardly through frame 14 or reversibly drive the articles along the conveyor path. The frame 14 can also define a conveyor path oriented at an inclination angle other than vertical, including a horizontal path.

Figure 2:
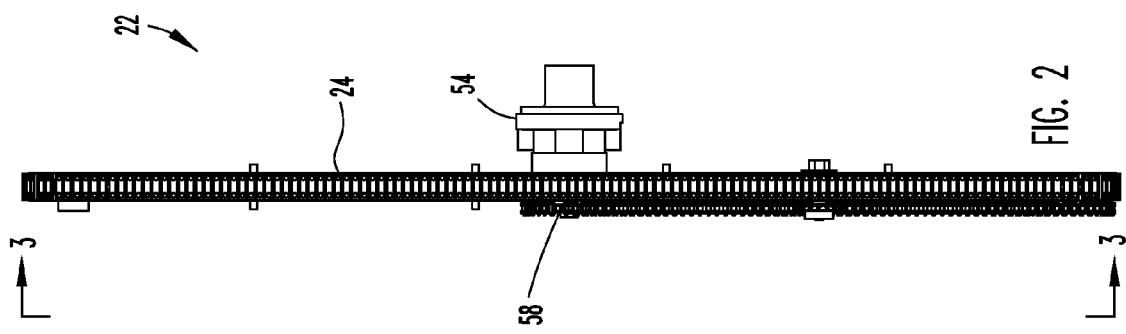
FIG. 2 is a front view of one of the roller chain assemblies of the vertical conveyor apparatus shown in FIG. 1.
Figure 3:
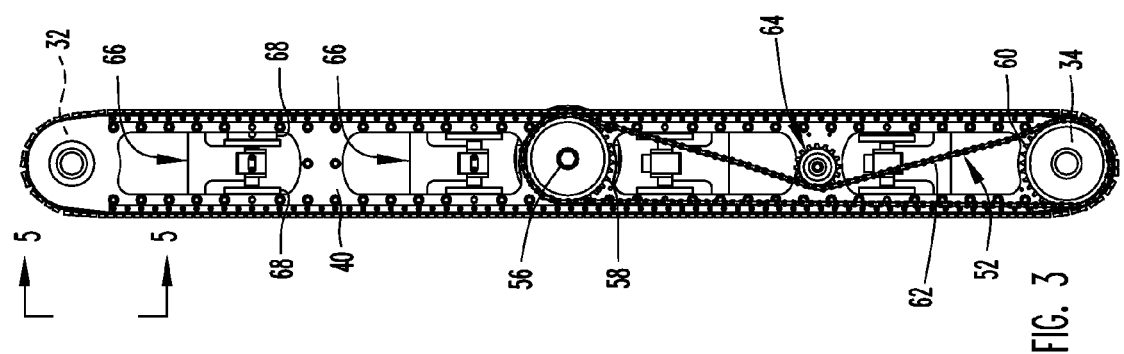
FIG. 3 is a side view of the roller chain assembly taken along line 3-3 of FIG. 2.
Figure 4:
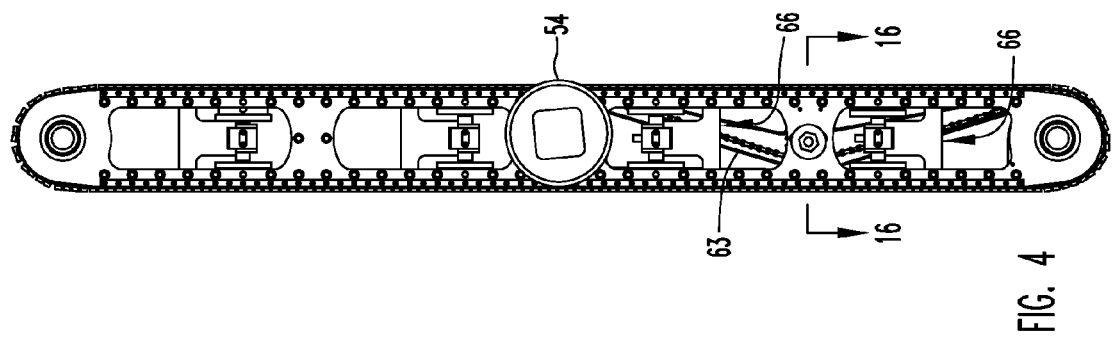
FIG. 4 is an opposite side view of the roller chain assembly shown in FIG. 3.

Mounted on the frame sides 18 are a number of driven roller chain assemblies 22 (see FIG. 2) that each include a like roller chain 24 (for clarity, only the roller chains 24 are shown in FIG. 1). The roller chains 24 face the conveyor path 12 and extend along the height of the conveyor path 12. Each roller chain 24 is a conventional small-pitch attachment chain. The illustrated roller chain 24 is an ANSI No. 50 chain having a 15.875-millimeter pitch, but other sizes and styles of chain can be used. The roller chain 24 carries a number of grippers formed as flat grip plates 26 (best seen in FIG. 5) that extend into the conveyor path 12 to grip the molding and move the molding along the conveyor path.

The roller chains 24 are arranged as facing pairs on both sides of the conveyor path 12 and spaced from each other in a direction transverse to the conveyor path. Roller chain pairs 24a, 24b are adjacent the frame end 18a and roller chain pairs 24e, 24f are adjacent the frame end 18b to grip the ends of the molding. Intermediate roller chains 24c, 24d are spaced along the frame sides 16 by adjustable-length spacers or spacer bars 28 of the frame 14. The pairs of roller chains 24 operate in parallel to move the molding along the conveyor path. It is understood that the number and spacing of roller chains 24 can vary from the illustrated embodiment to meet design needs.

Frame end plates 30 define the frame ends 18. The end plates 30 carry the roller chain assemblies 22 and the spacer bars 28 and may also be used to permanently mount the vertical conveyor 10.

It is anticipated that the length of the moldings being processed may vary from one production run to another. For example, ten-foot moldings may be processed in one run, and sixteen-foot moldings may be processed in a later run. The spacer bars 28 adjustably move adjacent facing pairs of roller chain assemblies towards or away from each other and enable the conveyor 10 to receive moldings of different lengths. The outer roller chain assemblies 22 can be located to grip the ends of the molding despite changes in molding length.

The end plates 30 enable facing pairs of roller chain assemblies 22 to move towards or away from each other. The distance between opposing roller chains 24 can be set a minimum distance of about one-and-three-eighth inches to a maximum distance of about eleven-and-three-eighth inches in one and two inch increments for accommodating production runs of varying molding thickness. In other embodiments the distance between opposing roller chains 24 can be a minimum of essentially zero for conveying thin films, paper, and the like.

Fixed-size frames 14 can also be used in other embodiments.

Figure 13:
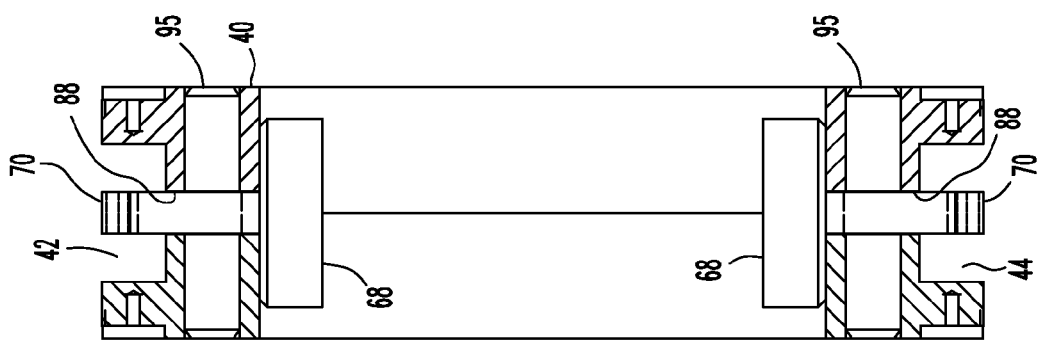
FIG. 13 is a sectional view illustrating the mounting of the stop blocks in the vertical rail, the view taken generally along line 13-13 of FIG. 10.

FIGS. 2-6 illustrate one of the roller chain assemblies 22. The roller chain 24 extends around upper and lower chain sprockets 32, 34 mounted on bearings held in open ends 36, 38 (see FIG. 7) of elongate vertical rail 40. The rail 40 defines channels 42, 44 (see FIG. 13) that receive the chain 24.

The chain 24 includes "U"-shaped bent link plates in which the upper link legs carry the grip plates 26 and the lower link legs 49 are supported against rail 40 by roller bearings formed as sets of pins 50 rotatably held in the rail 40. Two sets of pins 50 extend along the sides of each channel 42, 44 with the pin axes parallel with the sprocket axes. See FIGS. 6A and 6B. The outer portion of each pin 50 stands proud of the surrounding portion of the frame to engage and support a link leg 49.

Figure 6B:
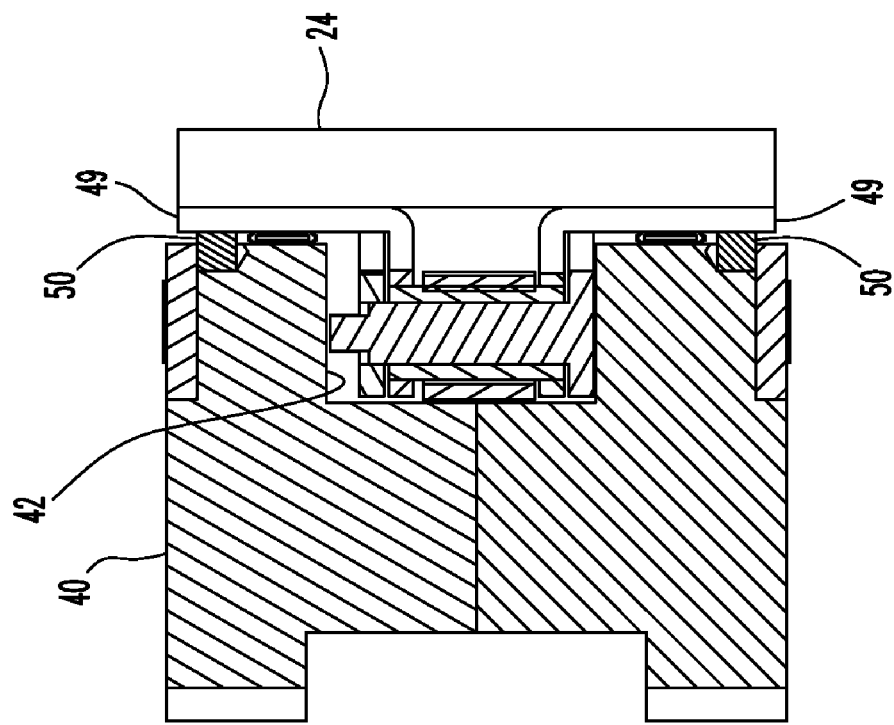
FIG. 6B is a sectional view taken along line 6B-6B of FIG. 6A.
Figure 6A:
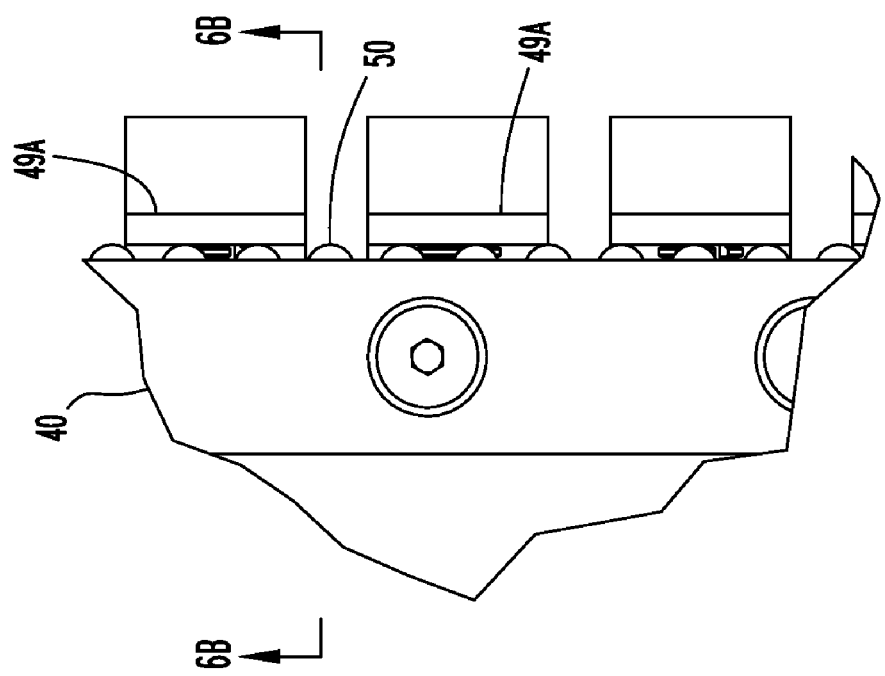
FIG. 6A is an enlarged view of the area enclosed in line 6A of FIG. 6.

The two sets of pins 50 cooperate to support both legs 49 of each link against rail 24. Furthermore, each set of pins 50 is closely spaced along the length of the channels 42, 44 so that preferably each link leg 49 is supported by at least two pins 50 while traveling along channels 42 or 44. For example, FIG. 6B illustrates link leg 49A instantaneously supported by two pins 50 and link leg 49B instantaneously supported by three pins 50.

The pins 50 resist deflection or sagging of the roller chain facing the conveyor path towards the rail and so enable the grip plates 26 to reliably engage and hold moldings even if the moldings touch one another. The pins 50 also provide clearance between the roller chain runs and the rail. When a link engages a bearing 50, the bearing 50 spaces the link away from the portion of the rail surrounding the bearing to permit continued movement of the chain run without mechanical interference against the rail under load. Because the pins 50 are arranged along both channels 42, 44, the roller chain assembly 22 can be mounted on the frame 14 with either roller chain run facing the conveyor path 12.

The lower roller chain sprocket 34 is driven by a roller chain drive 52 mounted on the rail 40. The chain drive 52 includes a conventional hydraulic brake motor 54 attached to one side of the rail midway between the roller chain sprockets 32, 34. The brake motor 54 can be attached on either side of the rail 40 as needed to avoid interference with any adjacent end plate 30 or adjoining structure.

The brake motor 54 has an output shaft 56 that extends through the rail 40 and drives a drive sprocket 58 located on the opposite side of the rail 40 from the brake motor 54. The drive sprocket 58 drives a driven sprocket 60 via drive chain 62. Sprocket 60 is non-rotatably attached to the lower chain roller sprocket 34. The sprockets 34, 60 are installed in the rail 40 such that the sprockets 58, 60 are on the same side of the rail 40. Drive chain 62 is a conventional motorcycle chain and is normally covered by a chain cover or shroud 63 (for clarity the shroud is not shown in FIGS. 2 and 3). The chain drive 52 further includes an idle sprocket assembly 64, described in greater detail below, that tensions the drive chain 62.

The brake motor 54 has a hydraulic motor actuated by the pressure of hydraulic fluid received through hose lines (not shown). The brake motor 54 contains a spring-applied, hydraulically released internal motor brake that stops the motor shaft 56 if hydraulic pressure is lost.

Working in parallel with the motor brake are four emergency stop assemblies 66 mounted in the rail 40. Each stop assembly 66, described in further detail below, includes a pair of movable stop blocks 68 (see FIG. 11) that engage the roller chain 24 to stop movement of the chain 20 in an emergency.

Figure 11:
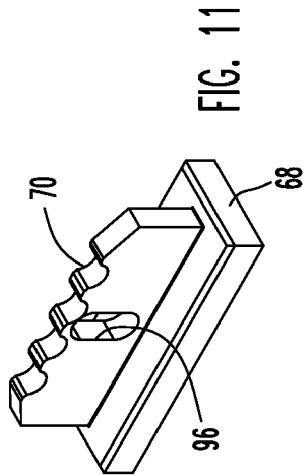
FIG. 11 is a perspective view of one of the stop blocks of the stop assembly shown in FIG. 10.
Figure 12:
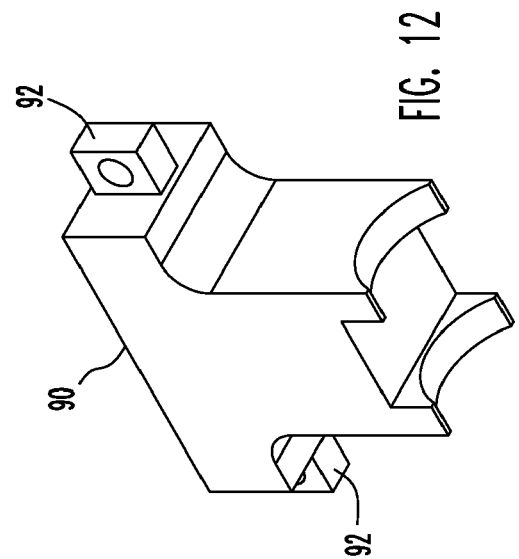
FIG. 12 is a perspective view of the cylinder bracket of the stop assembly shown in FIG. 10.
Figure 10:
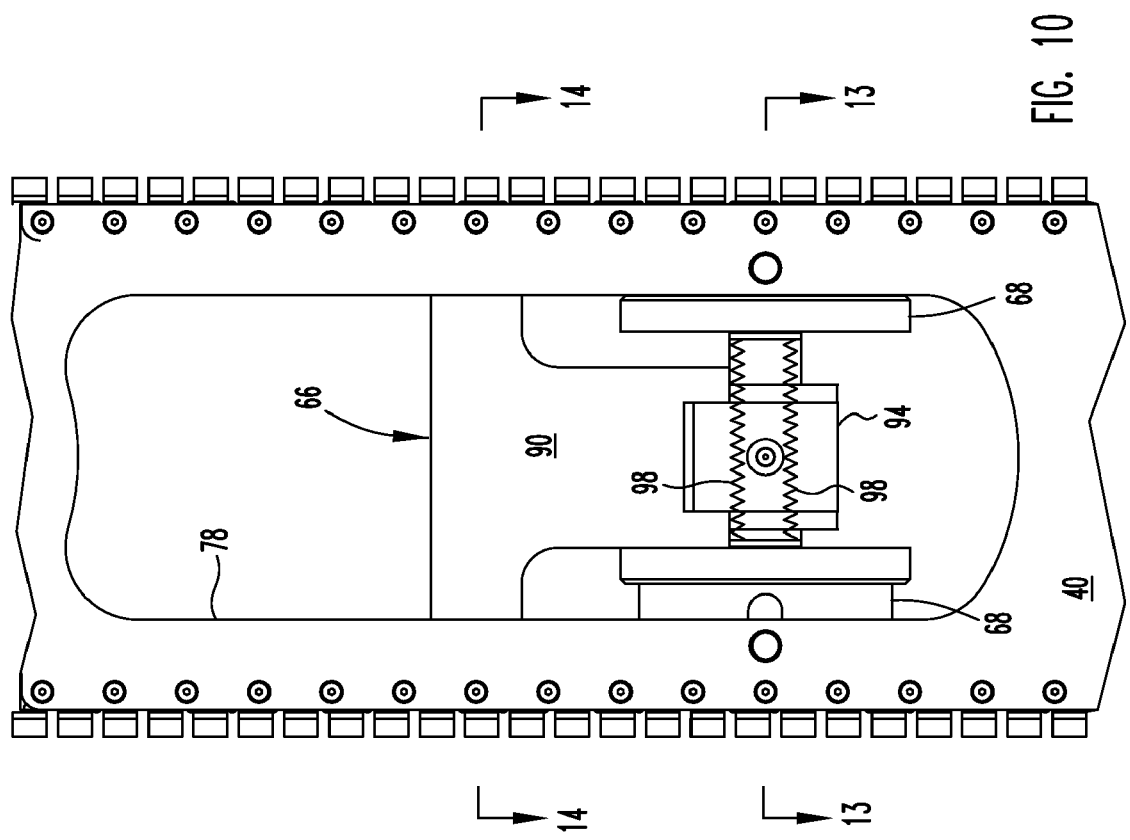
FIG. 10 is an enlarged view of one of the stop assemblies of the roller chain assembly.

As shown in FIG. 11, the stop block 68 has an end 70 that conforms to the size and pitch of the roller chain links.

FIGS. 7-9 illustrate the vertical rail 40. Vertical rail 40 includes through-bores 72, 74, and 76. Bores 72, 74 extend through the end openings 36, 38 and carry the roller sprocket bearings. Motor shaft 56 extends through the bore 76. Note that bore 76 is offset from the longitudinal centerline of the rail 40 to prevent the brake motor 54 from protruding into the conveyor path 12. Each emergency stop assembly 66 is contained within a respective rail opening 78a, 78b, 78c, and 78d.

Vertical rail 40 is formed as two rail halves 80, 82 to mount the idle sprocket assembly 64 and the emergency stop assemblies 66 to the rail 40. The rail halves 80, 82 are bolted together via bolt holes 84 arranged along the perimeter of the rail halves. The rail halves 80, 82 are mirror-images of one another except that bolt holes include counterbores formed in one rail half and threaded bores in the other rail half.

The rail halves 80, 82 define adjacent pairs of slots 86, 88 for installing the emergency stop assembly 66 in each rail opening 78.

FIGS. 10-14 illustrate one of the stop assemblies 66 mounted in a rail opening 78. The stop assembly 66 includes a mounting bracket 90 having ears 92 (see FIG. 12) held in the slots 86 by bolts 93 that mount the bracket 90 to the rail. The bracket 90 removably holds a hydraulic cylinder 94 (discussed in greater detail below) connected to the stop blocks 68 that extends or retracts the stop blocks 68 located in respective slots 88. The hydraulic cylinder 94 can be removably held by an interference fit, threaded fasteners, or equivalent structure to enable replacement of the cylinder 94 without disassembling the frame halves.

Each stop block 68 is pinned in its slot 88 by a pin 95 extending through an elongated block bore 96, enabling the stop block to move between extended and retracted positions. In the extended position the forward stop block ends 70 extend into the chain channel 42 and 44, and engages the links of the roller chain 24. In the retracted position the forward stop block ends 70 are spaced away from the roller chain 24.

Springs 98 operate in parallel with the hydraulic cylinder 94 and bias the stop members 68 to the extended position. The hydraulic cylinder 94 must be pressurized to retract the stop blocks 68 and compress the springs 98. The springs 98 urge the stop blocks 68 against the roller chain 24 and prevent movement of the chain 24 if cylinder pressure is lost.

Figure 16:
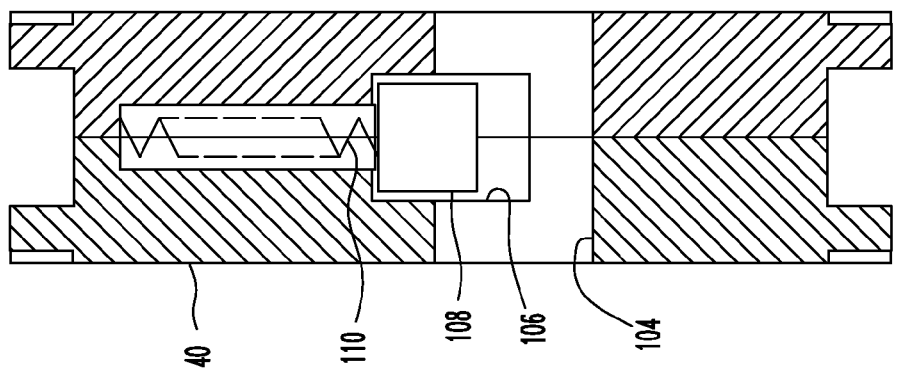
FIG. 16 is a sectional view illustrating the mounting of the push block and springs of the idle sprocket assembly in the vertical rail, the view taken generally along line 16-16 of FIG. 4.
Figure 14:
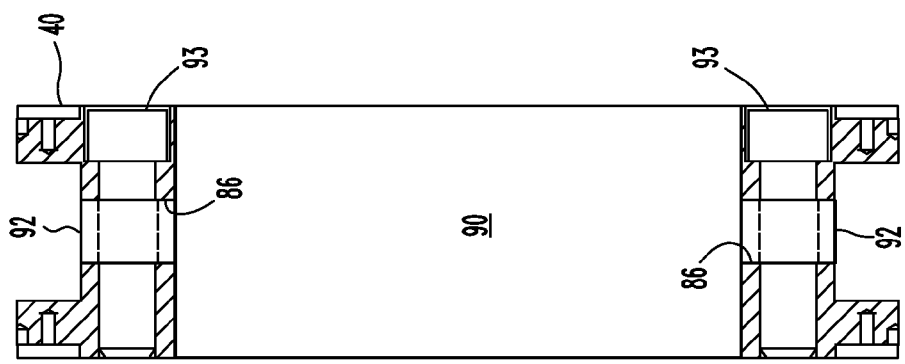
FIG. 14 is a sectional view illustrating the mounting of the cylinder bracket in the vertical rail, the view taken generally along line 14-14 of FIG. 10.
Figure 15:
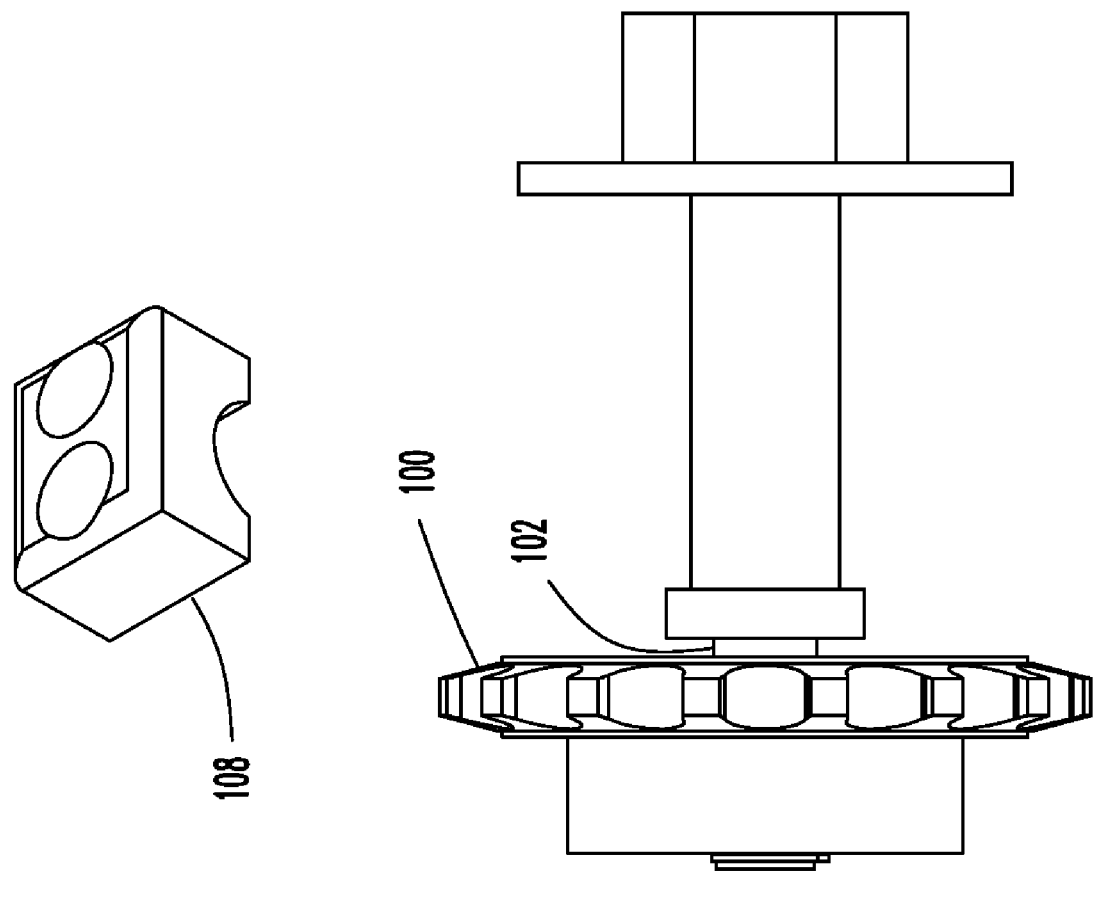
FIG. 15 illustrates some components of the idle sprocket assembly of the chain roller drive of the chain roller assembly.

The idle sprocket assembly 64 is shown in greater detail in FIGS. 15 and 16. The assembly 64 includes an idle sprocket 100 that engages the drive chain 62. The idle sprocket 100 is carried on a shaft 102 that extends through an elongate bore 104 (see FIG. 9) in the rail 40. The rail halves 80, 82 also define an interior pocket or chamber 106 that opens into the upper end of the bore 104. A push block 108 is urged against the shaft 102 by springs 110 and in turn urges the idle sprocket 100 against the drive chain 62.

Figure 17:
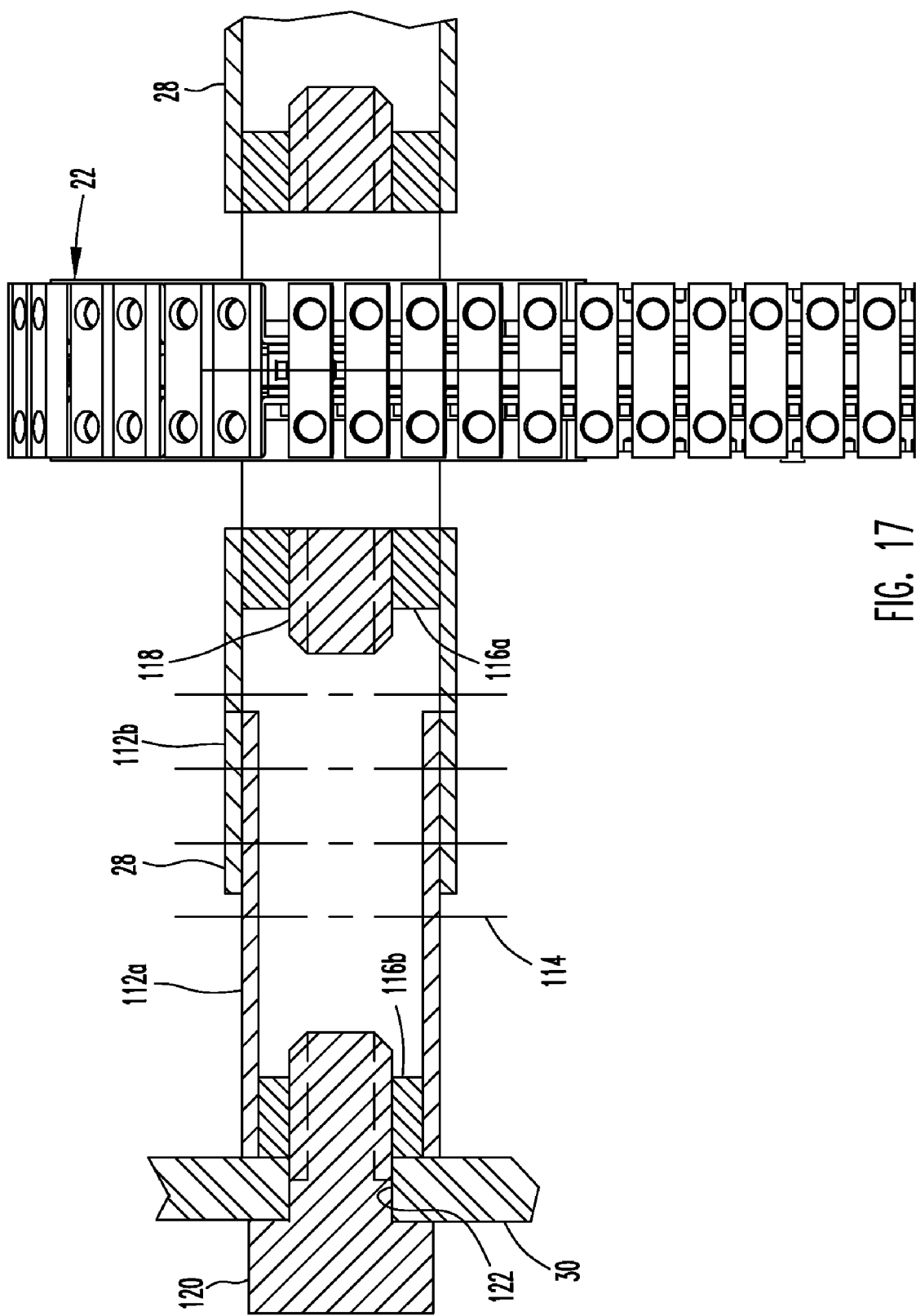
FIG. 17 is a sectional view illustrating attachment of one end of the roller chain assembly to the spacer bar and end plate.
Figure 19:
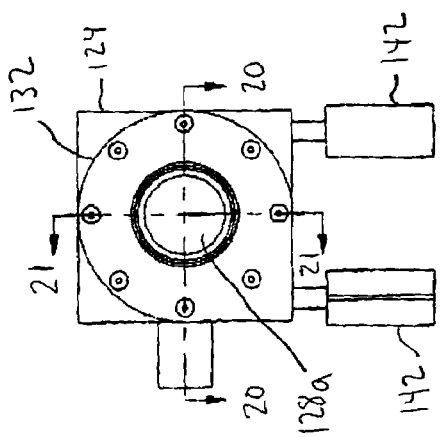
FIG. 19 is a top view of the cylinder shown in FIG. 18.

FIG. 17 illustrates attachment of the upper end of the roller chain assembly 22 to spacer bars 28 and end plate 30. Spacer bar 28 is formed as a telescoping tube and rod assembly having telescoping inner and outer tubes 112a, 112b. The tubes 112 include a number of through-holes 114 that receive a bolt (not shown) to fix the length of the spacer bar 28. Other types of adjustable spacer bar construction or adjustable-length members are known that can be readily adapted for use in frame 14.

Inner and outer plugs 116a, 116b are in the open ends of the spacer bar 28. A rod or stud bolt 118 having threaded shaft ends extends through the sprocket bearing of roller chain assembly 22. The spacer bars 28 are threaded on the stud bolt 118 as shown. Bolt 120 extends through end plate bolt hole 122 and outer plug 116. Plate 30 includes a number of bolt holes 122 for adjusting the distance between facing roller chain assemblies 22.

FIGS. 18-56 illustrate in greater detail the cylinder 94 of a stop assembly 66, and its component parts. The cylinder 94 includes a housing 124 having an interior cylinder wall 126 defining an interior cylinder chamber. Two pistons 128a, 128b are mounted in the chamber and slide along the bore wall 126. Each piston 128 carries a pair of spaced-apart O-rings 130 to seal the piston in the bore, and each piston 128 is attached to a stop block 68 to extend and retract the stop block.

The open ends of the cylinder housing 124 are closed by piston retainer flanges 132. The pistons 128 extend through flange bores 134. Cushion seals 136 seal the ends of the housing and cushion impact of the pistons 128 reaching their fully-extended positions. Each cushion seal 136 includes double-seal lips and a circumferential groove 138 facing the interior of the piston that defines a lip seal portion 140.

Figure 21:
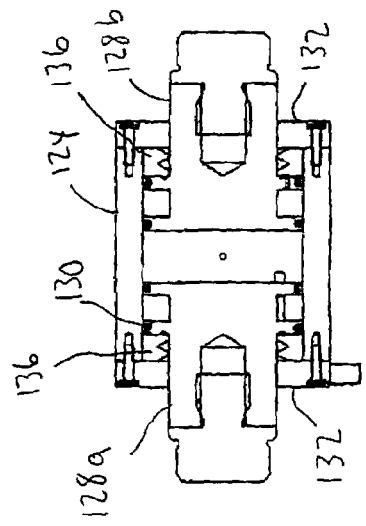
FIGS. 20 and 21 are sectional views taken along line 20-20 and line 21-21 respectively of FIG. 19.
Figure 18:
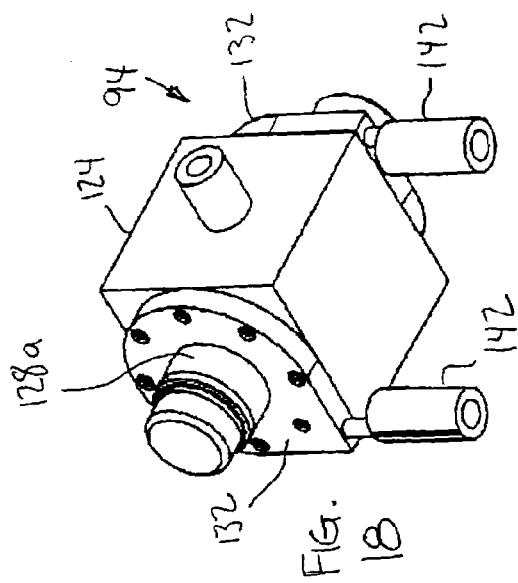
FIG. 18 is a perspective view of one cylinder of a stop assembly of the roller chain assembly.
Figure 20:
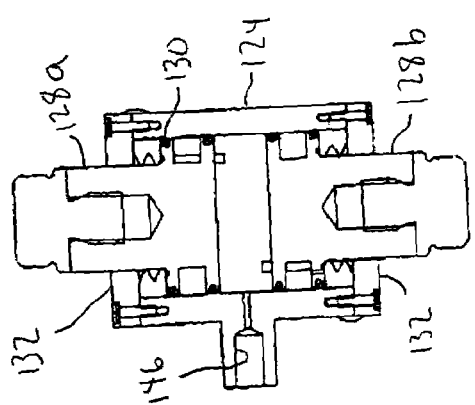
Figure 38:
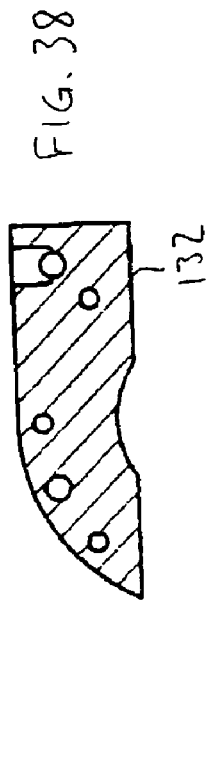
FIG. 38 is a partial sectional view taken along line 38-38 of FIG. 37.
Figure 37:
FIGS. 34-37 are front, rear, top, and side views respectively of a piston retainer flange of the cylinder shown in FIG. 18.
Figure 35:
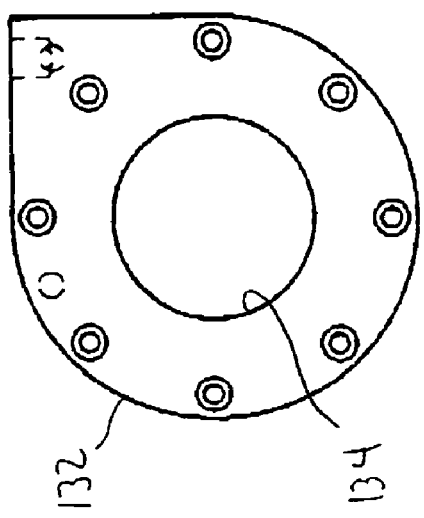
Figure 36:
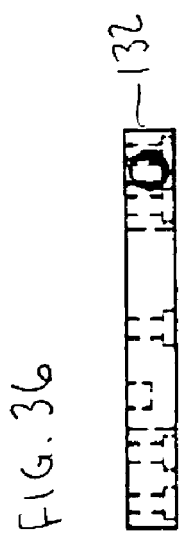
Figure 34:
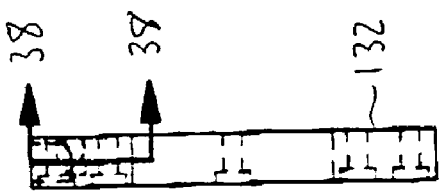
Figure 41:
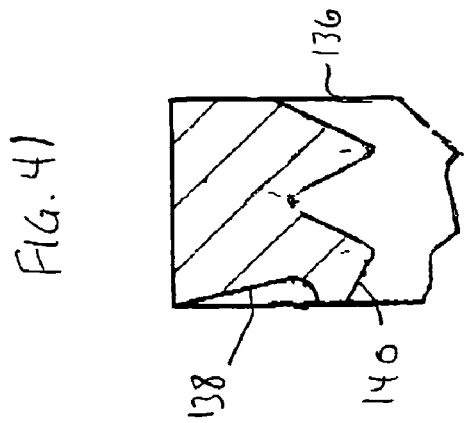
FIG. 41 is an enlarged view of the area taken along line 41-41 of FIG. 40.
Figure 40:
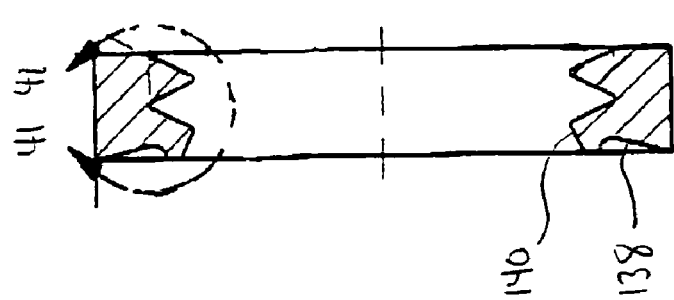
FIG. 40 is a sectional view taken along line 40-40 of FIG. 39.
Figure 39:
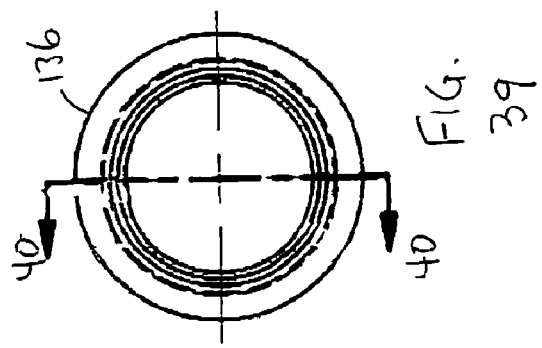
FIG. 39 is a front view of a cushion seal of the cylinder shown in FIG. 18.
Figure 53:
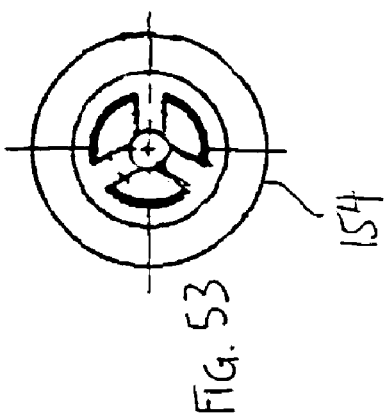
FIG. 53 is an end view of the piston shown in FIG. 52.
Figure 53A:
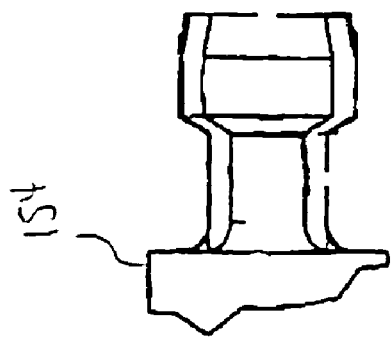
FIG. 53A is an enlarged view of the area taken along line 53A-53A of FIG. 53.
Figure 52:
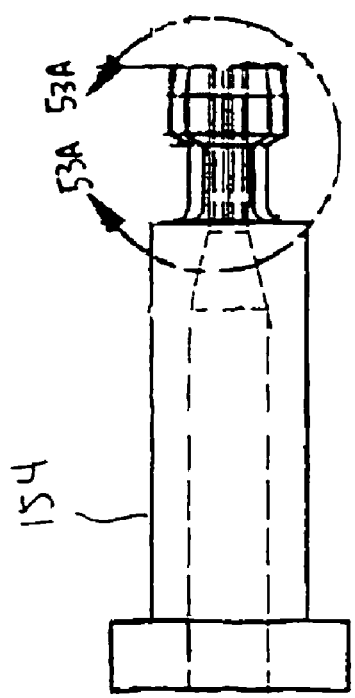
FIG. 52 is a side view of an actuator piston of the cylinder shown in FIG. 18.
Figure 56:
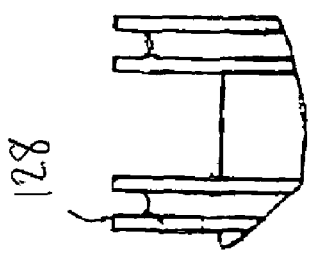
FIG. 56 is an enlarged view of the area taken along line 56-56 of FIG. 55.
Figure 55:
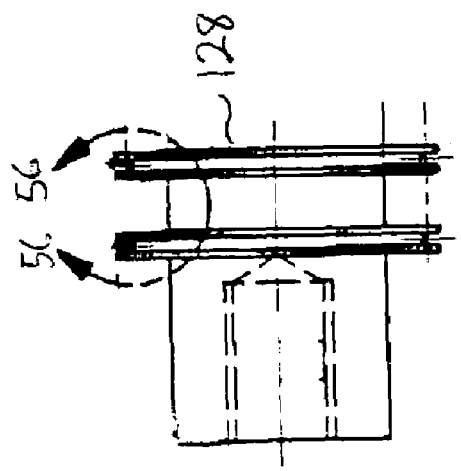
FIGS. 54-55 are front and side views respectively of a piston of the cylinder shown in FIG. 18.
Figure 54:
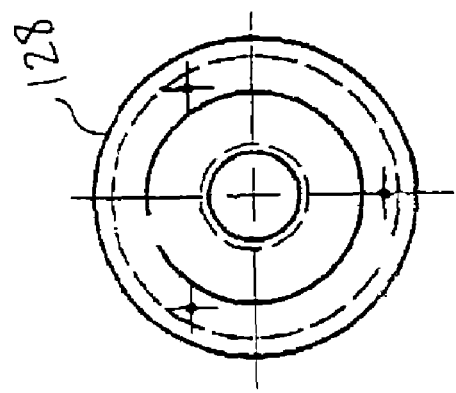

FIGS. 20 and 21 illustrate the pistons 128 in the extended position. During normal operation the cylinder 94 is pressurized to retract the pistons 128. Pressurized hydraulic fluid flows to the cylinder pistons 128 via tubular fluid connectors 142 attached to each flange 132. A fluid line 144 extends from each fluid connector 142 through the cylinder and opens into the seal groove 138 to pressurize the side of the piston facing the seal. The fluid pressure retracts the pistons and presses the seal lip portions 140 against the piston to form a tight circumferential pressure seal. Any fluid between the pistons drains through housing drain discharge 146.

If fluid pressure is lost, springs (not shown) urge the pistons 128 to their retracted positions. Fluid flows out of the cylinder 134 through fluid line 144.

Like actuator assemblies 148 are located in respective fluid lines 144 to define a predetermined stroke length of the pistons 128. Each actuator assembly 148 includes an actuator cylinder 150 located in a counterbore 152 in the cylinder housing facing flange 132. A tubular actuator piston 154 is slidably mounted in the cylinder 150 and is fluidly connected to a fluid manifold 156. Manifold 156 is also is also mechanically connected with piston 154 by a snap joint for conjoint movement with the piston. Manifold 154 moves in elongate slot 158 that opens into the cylinder bore. Pressurized fluid from connector 142 telescopes the actuator assembly, extending the piston 154 and manifold 156 and thereby placing the manifold in fluid communication with seal groove 138 to retract the piston.

If fluid pressure is lost when the pistons 128 are retracted, springs urge the pistons to their extended positions. Fluid flows through fluid lines 144 and out of the cylinder.

The actuator assembly is designed as snap-in parts for ease of assembly.

The end plates 30 are shown as separate members on each side of the frame, but each side of the frame 14 could be formed as a single unitary member.

During conveyor operation, the emergency stop assemblies 66 are pressurized to retract the stop blocks 68 into the rails 40. The hydraulic brake motors 54 are energized by the flow of pressurized fluid and drive the roller chains 24. The roller chains 24 receive molding from the top of the frame 14, transport the molding at a controlled speed along the conveyor path 12, and discharge the molding at the bottom of the frame 14.

The vertical conveyor 10 includes a machine controller 160 (see FIG. 57) operatively connected to the roller chain drives 52 to automatically start, stop, and reverse the conveyor 10.

The controller 160 is also operatively connected to the emergency stop assemblies 66, and receives control signals from conventional limit and control switches, sensors, emergency stop buttons, and the like (not shown). A control signal may represent an emergency condition or an emergency stop command. The controller 160 responds by removing hydraulic pressure from the brake motors 54 and emergency stop assemblies 66, causing the roller chains 24 to stop. The grip plates 26 hold the molding in the conveyor path 12 while the conveyor 10 is stopped.

Although grip plates 26 are illustrated as flat plates, other configurations are possible. Other materials can be attached to the upper surface of the grip plate to cushion the grip or to resist marking of articles held between grip plates.

The illustrated brake motor 54 protrudes slightly beyond the roller chain run not facing the conveyor path. In other possible embodiments the brake motor 54 or the chain sprockets can be sized such that the motor 54 does not protrude beyond the roller chain runs, or the motor 54 can be adjustably mounted on the rail 40 (with elongated fastener holes, for example) such that the roller chain assembly 22 can be placed with either roller chain run facing the conveyor path and the motor 54 not protruding into the conveyor path. Because both chain runs are supported against deflection, in such alternative embodiments the roller chain assembly 22 can be configured with either roller chain run facing the conveyor path and with the motor 54 mounted on either side of the rail 40 as desired.

Other arrangements of the roller chain assemblies are possible and represented in FIGS. 57-60. FIG. 57 represents the conveyor 10 in which each roller chain 24 extends the full length of the conveyor path, and the grip plates 26 are carried on one chain.

FIGS. 58 and 59 represent embodiments in which multiple roller chains are arranged in series along the length of the conveyor path. This allows roller chain assemblies like roller chain assembly 22 to convey articles along a conveyor path longer than each roller chain. The roller chain assemblies 22 can be used as modular units to extend the length of the conveyor path as needed or to change the inclination or slope of the conveyor path between intake and discharge ends.

FIG. 58 represents a second embodiment vertical conveyor having roller chains 224 like roller chain 24 each carrying grip plates 226 like grip plates 26. The roller chains 224 are arranged in series and each extends only partially along the length of the conveyor path. A gap 228 extends between adjacent roller chains 224, so the articles must be wide enough to span the gap to transfer from one roller chain to the other.

FIG. 59 represents a third embodiment vertical conveyor similar to that shown in FIG. 58. The conveyor includes adjacent roller chains 324a, 324b that also operates in series to move articles along the conveyor path. The roller chains 324 overlap in a direction parallel with the conveyor path so that articles are gripped by both roller chain grip plates 326 on the overlap portion of the conveyor path.

Grip plates 26, 226, and 326 are connected to a single roller chain and so the width of the grip plate is limited. FIG. 60 represents a fourth embodiment vertical conveyor in which each roller chain assembly includes a pair of spaced-apart roller chains 424a, 424b. Grip plates 426 span between the roller chains, with each end of grip plates 426 attached to a respective roller chain 424 and spanning between chains.

Roller chain link members 49 and bearing members 50 are configured to engage contact one another with line contact. In alternative embodiments the roller chain and bearing members could engage each other with spot contact. For example, bearing members 50 could be formed as spherical ball bearings.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. A conveyer for moving articles along a conveyor path, the conveyor comprising:
    a frame;
    a pair of roller chain assemblies mounted on the frame, each roller chain assembly comprising a rail, a pair of sprockets rotatably mounted on the rail for rotation about substantially parallel axes of rotation, and a roller chain extending around the rail and engaging the sprockets to be driven by the sprockets;
    the roller chain assemblies spaced apart from each other in a direction transverse to the axes of rotation and defining a conveyor path between them, the roller chain assemblies on opposite sides of the conveyor path whereby the roller chains engage oppositely facing sides of an article in the conveyor path;
    each roller chain comprising a plurality of interconnected chain links that engage the sprockets and a plurality of plates rigidly attached to the chain links for conjoint movement with the chain links, the chain links defining a loop and comprising a radially inner side on the inside of the loop and a radially outer side on the outside of the loop, the plates located on one of the said sides of the chain links;
    each plate attached to a respective chain link and extending away from the chain link in a direction parallel with the axes of rotation;
    each rail comprising a plurality of bearings mounted on the rail facing the conveyor path, the bearings engagable against the plates to support the roller chain against deflection towards the rail; and
    a drive operatively connected to the roller chain assemblies for driving each of the said chain runs in a drive direction along the conveyor path to move an article along the conveyor path in the drive direction.

2. The conveyor of claim 1 wherein each plurality of bearings comprises a plurality of pins rotatably mounted on the rail.

3. The conveyor of claim 1 wherein each plurality of bearings comprise first and second sets of bearings, the sets of bearings spaced apart from one another in a direction parallel with the rotational axes.

4. The conveyor of claim 1 wherein each plurality of bearings is spaced along the rail such that a plate can be simultaneously supported by at least two bearings.

5. The conveyor of claim 1 wherein each plate comprises a planar surface that faces and engages the bearings.

6. The conveyor of claim 1 wherein each rail comprises a recess, the chain links in the recess and the plates outside of the recess.

7. The conveyor of claim 1 wherein each bearing comprises an outer portion that stands proud of the surrounding portion of the rail whereby the bearing spaces the plates away from the surrounding rail portion.

8. The conveyor of claim 1 wherein each rail comprises a first side facing the conveyor path and an opposite second side, the plurality of bearings on the first side of the frame, and the rail further comprises a second plurality of bearings on the second side of the frame.

9. The conveyor of claim 1 wherein the bearings and plates of each roller chain assembly are disposed to engage one another in line contact.

10. The conveyor of claim 3 wherein the plates of each roller chain assembly each comprise spaced apart first and second flat portions, the first portion engageable with the first set of roller chain assembly bearings and the second portion engageable with the second set of roller chain assembly bearings.

11. The conveyor of claim 1 wherein the plates of each roller chain are located on the outer sides of the chain links, and each roller chain further comprises gripper plates attached to the support plates and located on the outside circumference of the roller chain.

12. A roller chain assembly for a roller chain conveyor formed from at least a pair of said roller chain assemblies, the roller chain assembly comprising:
    an elongate rail comprising opposite sides, first and second sprockets rotatably mounted on the rail, a roller chain extending around the first and second sprockets and surrounding the rail, and a chain drive connected to the roller chain to drive the roller chain;
    the roller chain comprising a plurality of chain links engagable with the sprockets and a plurality of support plates rigidly attached to the chain links for conjoint movement with the chain links, the chain links arranged in a loop and comprising an inner side on the inside of the loop and an outer side on the outside of the loop, the support plates located on one of the said sides of the chain links;
    the rail comprising a plurality of bearing members mounted on at least one side of the rail, the bearing members spaced along the length of the rail and facing the support plates, the bearing members comprising outer portions extending away from the remainder of the rail to engage the support plates and limit deflection of the roller chain towards the rails;
    wherein the roller chain comprises an elongate chain run extending along the rail, and the plurality of bearing members comprises first and second sets of bearing members, the sets spaced away from each other in a direction transverse to the direction of the chain run.

13. The roller chain assembly of claim 12 wherein the plurality of bearing members comprises a plurality of rotatable members.

14. The roller chain assembly of claim 12 wherein each bearing member is a non-spherical member.

15. The roller chain assembly of claim 12 wherein the plurality of bearing members extend along a recess in the rail.

16. The roller chain assembly of claim 12 wherein the bearing members are spaced apart from each other along the rail and are spaced sufficiently close together so that the support plates can each be simultaneously engaged by at least two bearing members.

17. The roller chain assembly of claim 12 wherein the plurality of bearing members comprises a first set of bearing members on one side of the rail and a second set of bearing members on the other side of the rail whereby either side of the rail can face a conveyor path and have the roller chain supported against deflection caused by load.

18. The roller chain assembly of claim 12 wherein each support plate comprises a flat surface facing the bearing members to contact the bearing members.

19. The roller chain assembly of claim 12 wherein the support plates and the bearing members are configured to engage one another in line contact.

20. The roller chain assembly of claim 12 wherein the support plates each comprise first and second planar surfaces, each surface engagable with a respective first or second set of bearing members.

21. The roller chain assembly of claim 12 wherein the support plates are located on the outer sides of the chain links, and the roller chain further comprises gripper plates attached to the support plates and located on the outer circumference of the roller chain.

22. A conveyer for moving articles along a conveyor path, the conveyor comprising:

a frame;

a pair of roller chain assemblies mounted on the frame, each roller chain assembly comprising a rail, a pair of sprockets rotatably mounted on the rail for rotation about substantially parallel axes of rotation, and a roller chain extending around the sprockets to be driven by the sprockets;

each roller chain comprising a chain run facing a side of the rail;

each rail comprising a plurality of bearings rotatably mounted on the rail facing the chain run, the bearings engagable against the chain run to support the chain run against deflection towards the rail, each plurality of bearings comprises first and second sets of bearings, the sets of bearings spaced apart from one another in a direction parallel with the rotational axes;

the roller chain assemblies spaced apart from each other in a direction transverse to the axes of rotation and defining a conveyor path between them, the roller chain assemblies on opposite sides of the conveyor path with each chain run extending along a respective side of the conveyor path whereby the chain runs engage oppositely facing sides of an article in the conveyor path; and a drive operatively connected to the roller chain assemblies for driving each of the said chain runs in a drive direction along the conveyor path to move an article along the conveyor path in the drive direction.

23. The conveyor of claim 22 wherein roller chain comprises a plurality of interconnected chain links, the chain links between the first and second sets of bearings.

24. The conveyor of claim 22 wherein each roller chain assembly comprises a plurality of gripper plates attached to the roller chain, the gripper plates overlying the first and second sets of bearings.

25. A roller chain assembly for a roller chain conveyor formed from at least a pair of said roller chain assemblies, the roller chain assembly comprising:

an elongate rail, first and second sprockets rotatably mounted on the rail, a roller chain extending around the first and second sprockets and surrounding the rail, and a chain drive connected to the roller chain to drive the roller chain;

the rail comprising opposite sides, each side facing a respective chain run of the roller chain, and a plurality of bearing members mounted on at least one side of the rail, the bearing members spaced along the length of the rail and facing the chain run, the bearing members comprising outer portions extending away from the remainder of the rail to engage the chain run and limit deflection of the chain run towards the rail; the plurality of bearing members comprising first and second sets of bearing members, the sets spaced away from each other in a direction transverse to the direction of the chain run.

26. The roller chain assembly of claim 25 wherein the first and second sets of bearing members are located on opposite sides of the roller chain.

27. The roller chain assembly of claim 25 wherein the roller chain comprises a plurality of interconnected chain links and a plurality of gripper plates rigidly attached to the chain links for conjoint movement with the chain links, the chain links arranged in a closed loop, the gripper plates on the outside of the loop.

* * * * *

UNITED STATES PATENT AND TRADEMARK OFFICE
CERTIFICATE OF CORRECTION

PATENT NO. : 7,434,679 B2 Page 1 of 1
APPLICATION NO. : 11/469494
DATED : October 14, 2008
INVENTOR(S) : Swartz It is certified that error appears in the above-identified patent and that said Letters Patent is hereby corrected as shown below:

Column 10, Line 41, replace "rails" with --rail--.

Signed and Sealed this

Second Day of December, 2008

JON W. DUDAS
*Director of the United States Patent and Trademark Office*